United States Patent [19]
Kazlauskas et al.

[11] 3,777,115
[45] Dec. 4, 1973

[54] APPARATUS FOR CONTROLLING ELECTRODE OSCILLATION

[75] Inventors: Gasparas Kazlauskas, North Hollywood; Kennison L. Vowell, Canoga Park, both of Calif.

[73] Assignee: Astro-Arc Co., Sun Valley, Calif.

[22] Filed: Feb. 22, 1972

[21] Appl. No.: 227,886

[52] U.S. Cl. ............ 219/125 R, 219/60 R, 219/76, 219/137
[51] Int. Cl. ............................................. B23k 9/12
[58] Field of Search ................. 219/125 R, 125 PL, 219/76, 60 R, 60 A, 61, 137

[56] References Cited
UNITED STATES PATENTS

| | | | |
|---|---|---|---|
| 3,230,341 | 1/1966 | Blackburn | 219/125 R |
| 3,646,309 | 2/1972 | Smith et al. | 219/125 PL |
| 3,005,901 | 10/1961 | King | 219/125 R |
| 3,619,552 | 11/1971 | Gordon | 219/125 R |
| 3,621,183 | 11/1971 | Chambonnet | 219/125 PL |
| 3,135,857 | 6/1964 | Von Voros | 219/125 PL |

*Primary Examiner*—R. F. Staubly
*Assistant Examiner*—L. A. Schutzman
*Attorney*—Robert E. Geauque

[57] ABSTRACT

A welding apparatus wherein the welding electrode is moved transversely in oscillating motion across the weld path, the electrode to be capable of dwelling at either the fore or aft point of maximum displacement of the transverse movement path, the voltage between the electrode and the workpiece is automatically maintained constant by means of an automatic voltage control mechanism.

19 Claims, 17 Drawing Figures

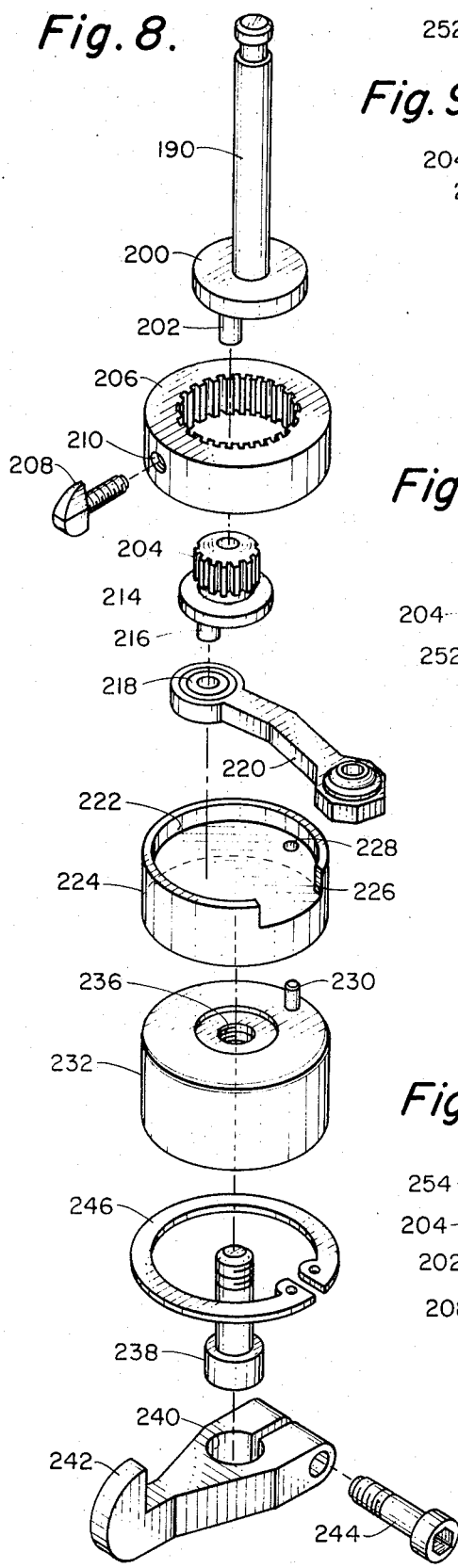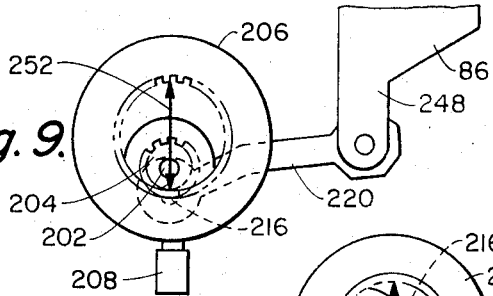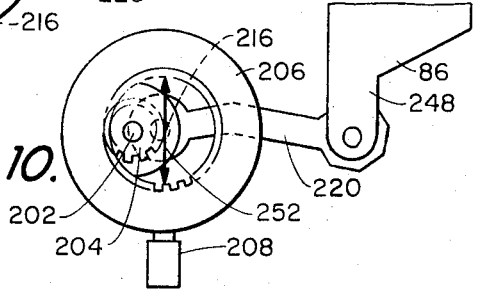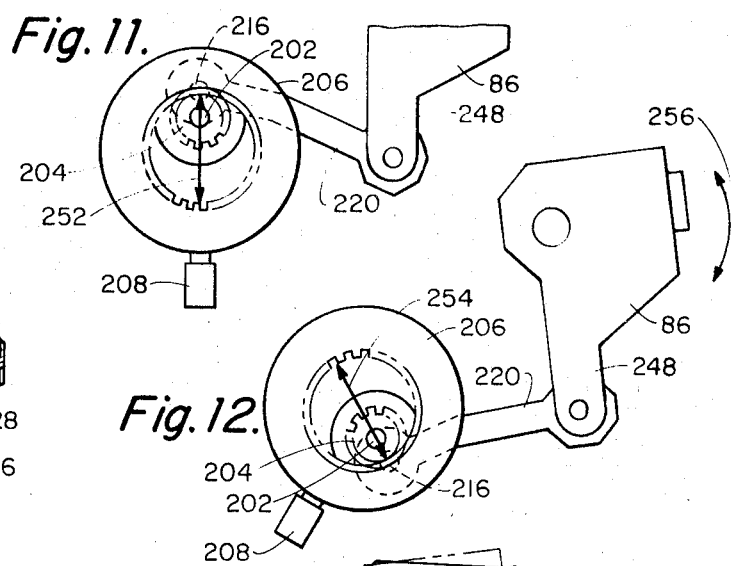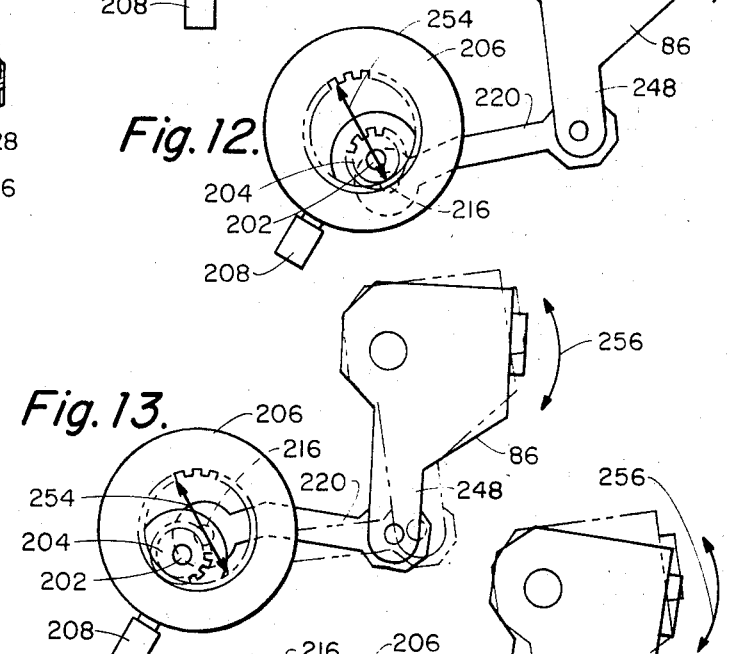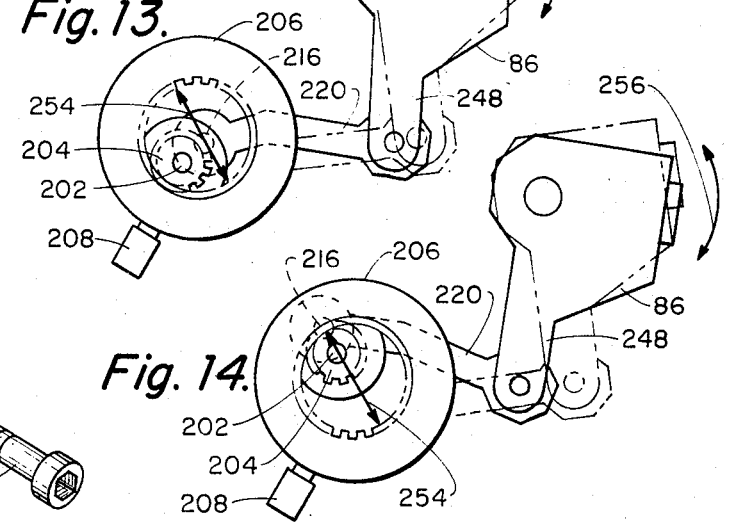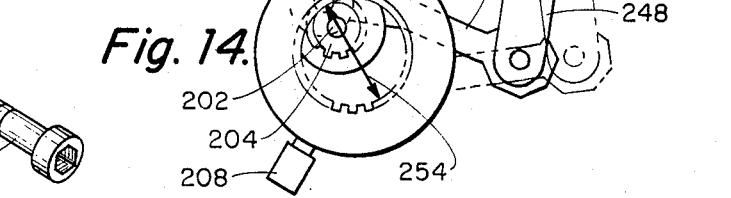

APPARATUS FOR CONTROLLING ELECTRODE OSCILLATION

BACKGROUND OF THE INVENTION

The field of this invention relates to the welding of separate metallic cylindrical tubular elements by the gas shielded tungsten electro-arc welding process. More particularly, this invention relates to welding apparatus which produces efficiently an extremely strong weld. This invention contemplates an apparatus which employs automatic gas tungsten arc-welding along a circumferential path in tubular structures.

Within recent years there have been commercially available structures to automatically weld together separate sections of pipe. These structures are required to compensate for the problem of the welding of the larger diametered workpieces. These structures effect the welding operation automatically, it only being necessary to locate the pipe sections within the welding apparatus and initiating the welding procedure.

However, the structures of the prior art have included certain inherent deficiencies. The weld bead produced may frequently be a half an inch or more in width. A welding electrode which moves in a straight line to produce the weld bead results with the weld bead being quite high in the center and not filled in at the sides of the weld. Therefore, in order to avoid this, it is desirable to have the welding electrode oscillate transversely across the weld bead as the welding electrode moves longitudinally.

It has further been found that even with transverse oscillation of the welding electrode, the produced weld bead still tends to be high in the center and not filled in at the edges. This occurs especially in instances of welding of the larger diametered work pieces. Prior to the apparatus of this invention, it is believed that there is no known apparatus to overcome this deficiency.

Another important feature of automatic welding apparatuses is that the welding voltage be maintained substantially constant in order to produce a strong weld over the entire length of the weld bead. However, under normal circumstances, as the electrode moves over the workpiece, the distance of the electrode from the workpiece will vary. The arc voltage is a direct function of the distance of the electrode from the workpiece.

Previously there have been attempts at designing automatic voltage control apparatuses to be employed in combination with automatic pipe welding structures. However, previously the automatic voltage control apparatuses effect movement of the welding electrode at relatively slow speeds, typically 5 to 20 inches per minute. As a result, except when the electrode moves quite slowly, the automatic voltage control system is not capable of responding instantaneously to arc voltage changes. In other words, there may exist an undesirably long interval between change in arc voltage and attempts at correction. It is desirable to produce the weld as fast as possible and for this reason the electrode normally moves at several feet per minute. Therefore, within the prior art the automatic voltage control systems are not capable of responding quickly enough to maintain a preset gap between the electrode and the workpiece. The end result is a weld which is poor in quality and may readily break.

SUMMARY OF THE INVENTION

The welding electrode within this invention is connected to a support means which is pivotally mounted to the welding apparatus housing. An actuating arm is pivotally mounted with respect to the support means with the free end of the arm rotationally secured to an external gear. The external gear is in continuous engagement with an internal gear. A drive means is to be connected to the external gear and is to effect rotation of the external gear about the internal gear. As a result of the external gear moving about the internal gear, a substantially linear movement of the actuating arm is produced which results in a slightly arcuate movement of the welding electrode by reason of the support means being pivoted back and forth in an oscillatory motion. The internal gear is supported within a housing and is capable of manual pivotal movement in respect thereto. By manually pivoting the internal gear, the relationship between the internal gear and the external gear changes. This relationship can vary from no oscillation of the welding electrode to a point of maximum oscillating displacement of the welding electrode. This amount of oscillation is to be preestablished prior to welding in view of the size of the weld bead to be produced.

The motor which is employed to drive the external gear also effects rotation of an idler gear. The idler gear is the same size as the external gear and makes one complete revolution in the same time that it takes for the external gear to make one complete revolution. The idler gear includes a pair of diametrically spaced apart apertures with the apertures being located at different radial spacing with respect to each other. A light source is to be located on one side of the disc with a first and second photocell located on the opposite side of the disc. The first photocell is to be lined up with one of the apertures so that upon the idler gear making a complete revolution, light from the light source will pass through one of the apertures into contact with the first photocell. The second photocell is located so that in a similar manner the light from the light source will pass through the other of the apertures and into contact with the second photocell. The arrangement of the apertures is such that the light from the light source will pass through the first photocell with the welding electrode located at one end of its transverse path movement and the second photocell will be activated when the electrode is at the opposite side of the transverse movement path. Upon either photocell being activated, the driving motor is disengaged from the driving of the external gear for a period of time. This period of time may be selected to run for a few tenths of a second or a few seconds. After the desired time of dwell has occurred, the motor is automatically reengaged thereby continuing the oscillatory movement of the welding electrode.

The automatic voltage control apparatus included within this invention employs the use of a torque motor to effect extremely quick movement of the welding electrode toward and away from the workpiece. To stop the motor instantaneously and prevent the motor from running inertially, a braking circuit is employed about the motor to immediately short circuit the motor upon being disengaged. The voltage between the welding electrode and the workpiece is constantly being measured and is transmitted to a comparison type of apparatus. Within the comparator the sensed voltage is compared with the reference voltage and an error voltage, either positively or negatively, is ascertained. This error voltage, if it exceeds a deadband voltage, is transmitted to effect driving of the motor either clockwise or counterclockwise, as desired, to cause extremely quick movement of the welding electrode either toward and away from the workpiece. Since the distance the electrode is from the workpiece directly effects the arc voltage, the arc voltage is therefore controlled and is to be maintained at a substantially preset constant value. Additionally, a safety device is employed within the automatic voltage control apparatus of this invention wherein if the workpiece was removed and displaced a substantial distance from the welding electrode, it would be possible with prior art devices to strike the arc of the welding electrode. This could be very undesirable as potential injury could occur or damage to other structures. Therefore, if the workpiece is removed, a potential occurs between an electronics ground and the welding arc ground. This potential results in operation of a transistor which in turn operates a relay which opens the circuit to the welding electrode. Therefore, it is not possible to initiate the welding operation.

BRIEF DESCRIPTION OF THE DRAWINGS

FIG. 8 is an exploded isometric view of the mechanism included within this invention to effect the oscillatory movement of the welding electrode;

FIGS. 9 to 14 are schematic views showing different positions of the oscillatory motion apparatus within this invention to effect a different amount of oscillating motion of the welding electrode;

DETAILED DESCRIPTION OF THE SHOWN EMBODIMENTS

Figure 1:
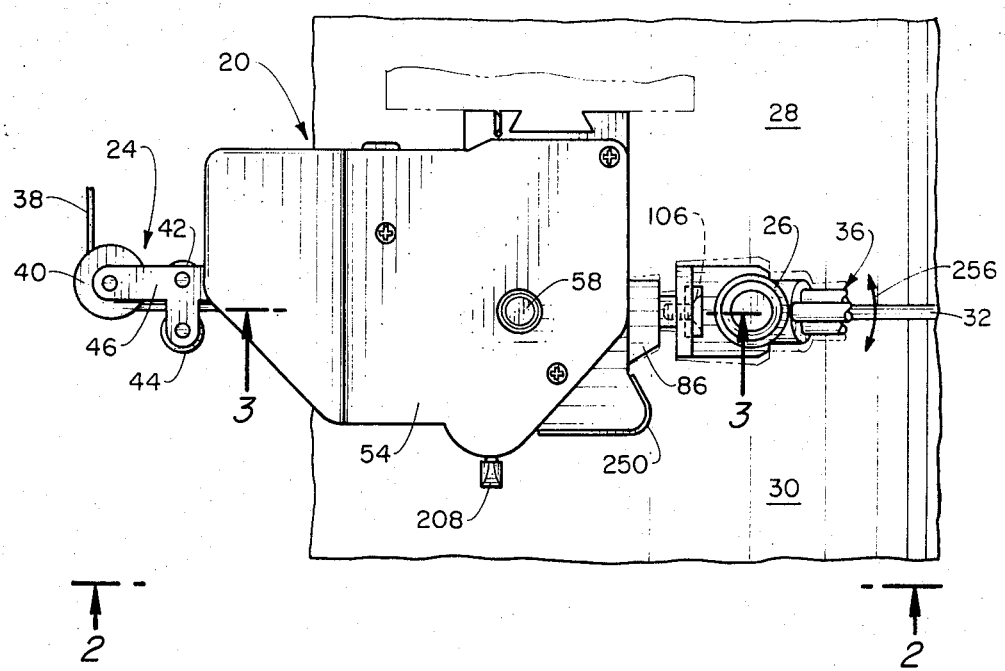
FIG. 1 is a plan view of the welding apparatus of this invention showing the welding apparatus in operation to join together separate segments of a pipe type of workpiece.
Figure 2:
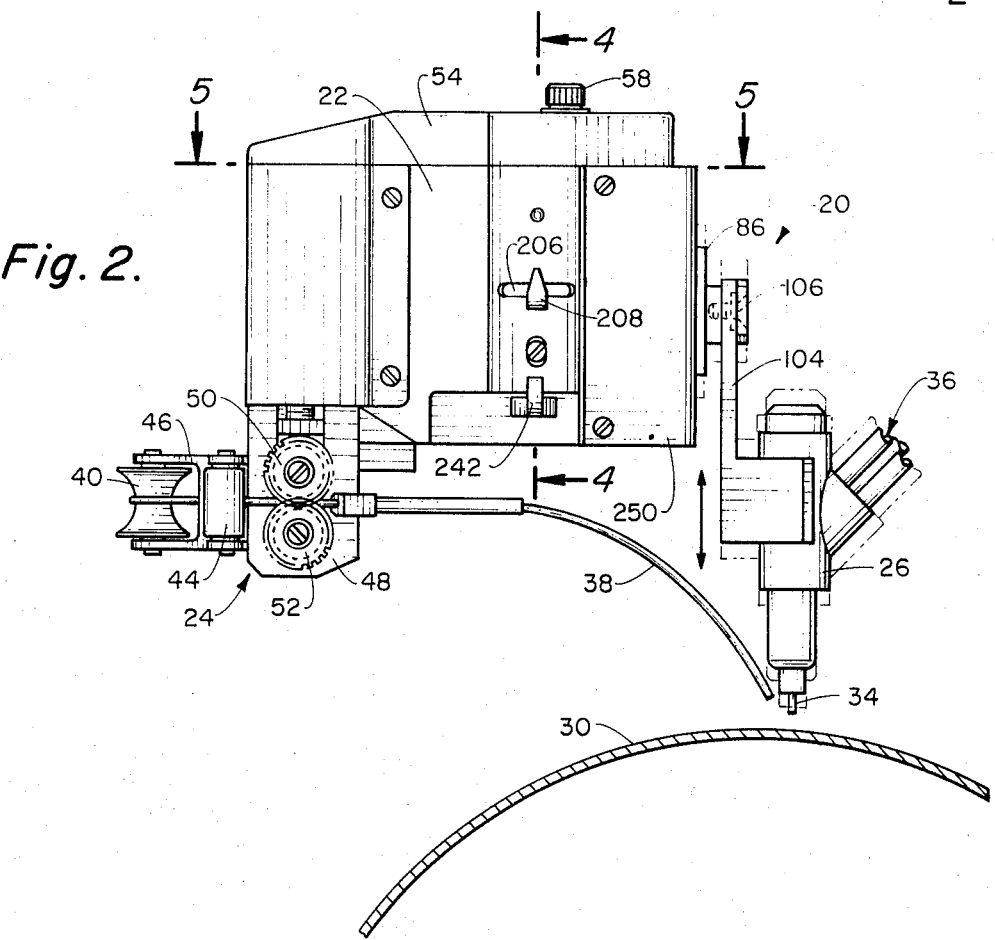
FIG. 2 is a front view of the apparatus shown in FIG. 1 taken along line 2—2 of FIG. 1.
Figure 3:
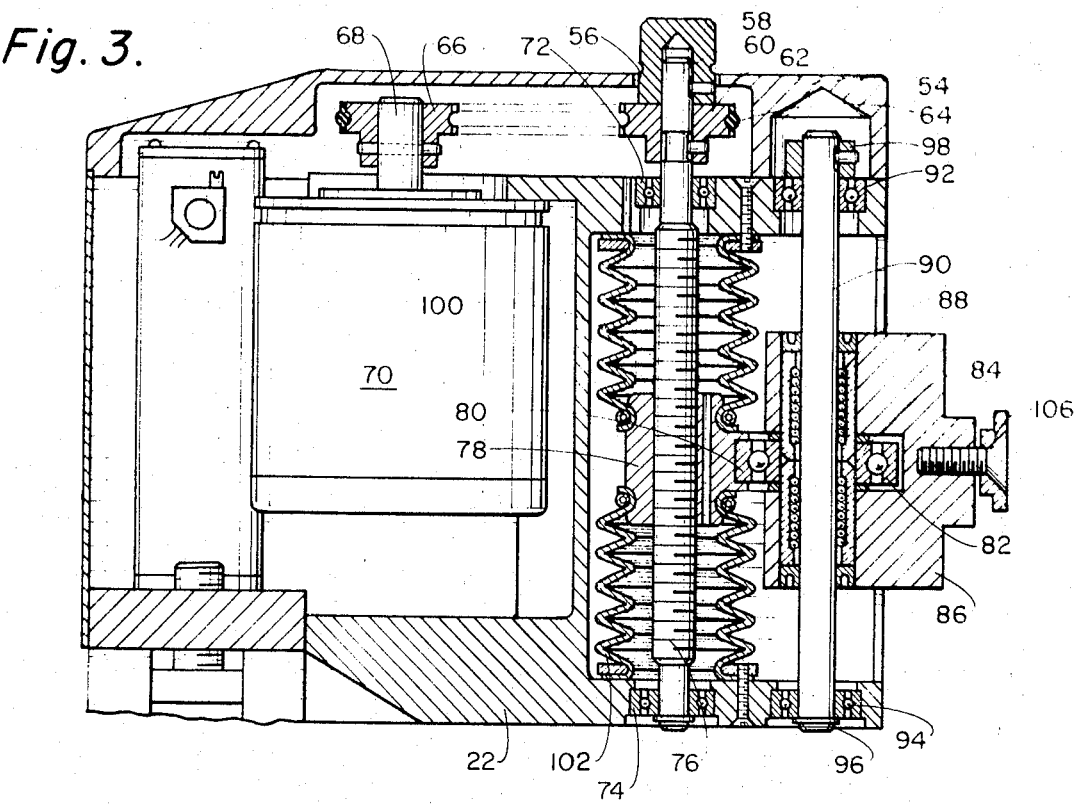
FIG. 3 is a cross-sectional view of the apparatus of this invention taken along line 3—3 of FIG. 1.

Referring particularly to the drawings, there is shown in FIG. 1 the welding head apparatus 20 of this invention which includes basically an apparatus housing 22, a filler wire feeding mechanism 24, and an electrode housing 26. The welding head apparatus 20 is to provide for welding of a first cylindrical tube 28 to a second cylindrical tube 30 by the gas tungsten arc-welding process. The welding head apparatus 20 is to produce a welding bead 32 to result in the integral connection between the first cylindrical tube 28 and the second cylindrical tube 30. It is envisioned that the cylindrical tubes 28 and 30 are to be of enlarged diameters in what is commonly termed pipes. Although the apparatus of this invention has been found to be particularly applicable to the welding of enlarged diameter structures, it is to be considered within the scope of this invention to employ the apparatus of this invention in other welding environments such as welding smaller diametered structures.

Within the electrode housing is supported a welding electrode 34. Flexible conduits 36 are to supply within the electrode housing 26 the electrical energy to the electrode 34 and also an inert gas to be conducted about the electrode 34 to the welding area. The internal components of the electrode housing 26 forms no direct part of this invention and therefore need not be described here in detail. The elements thereof are considered to be conventional and well known in the field. Additionally, the electrical energy to the electrode 34 as well as the inert gas is deemed to be supplied from conventional sources and also need not be described here in detail. It is to be noted that the electrode 34 is basically what is termed a non-consumable electrode and will normally be formed of a tungsten material.

A filler wire 38 is to be supplied to the welding area by means of the feeding mechanism 24. The feeding of the filler wire 38 is to be automatically accomplished by means of a control mechanism, not shown. The wire 38 is conducted from a spool, not shown, about idler pulley 40 and in between the rollers 42 and 44. The rollers 42 and 44, as well as the pulley 40, are rotatably supported upon the support plate 46. The support plate 46 is fixedly secured to motor housing 48. The motor housing 48 includes a motor, not shown, which is used to employ the drive pulley 50. The drive pulley 50 cooperates with an idler pulley 52. The filler wire 38 is to be frictionally bound between the drive pulley 50 and the idler pulley 52 which, upon rotation of the drive pulley 50, effects longitudinal movement of the filler wire 38. The motor within the motor housing 48 is to be automatically controlled so that the end of the filler wire 38 is maintained directly adjacent the welding area.

Secured by a screw type of fastening means to the apparatus housing 22 is a cover 54. The function of the cover 54 is to protect the moving components located within the apparatus housing 22. Located within the cover 54 is an opening 56. The opening 56 is provided to permit the shaft nut 58 to pass therethrough. The shaft nut 58 is fixed upon shaft 60. A gear 62 is fixed upon the shaft 60 directly adjacent the nut 58. A belt 64 cooperates with the gear 62 with the other end of the belt 64 being connected to a drive gear 66. The drive gear 66 is fixedly secured upon motor shaft 68 of the motor 70. The motor 70 is fixedly located within the apparatus housing 22 by means, not shown.

The motor 70 is to be activated from a source, not shown, and is to effect rotation of the motor shaft 68 and the drive gear 66. This rotational movement is transferred by means of the belt 64 to the gear 62. It is to be noted that the motor 70 is capable of being rotated either clockwise or counterclockwise. Upon the gear 62 being rotated, the shaft 60 is rotated either counterclockwise or clockwise.

The shaft 60 is rotatably supported by bearing assemblies 72 and 74 which are fixed within the apparatus housing 22. The shaft 60 includes a series of screw threads 76 which are in continuous engagement with a threaded block 78. The threaded block 78 is fixedly secured to the outer race 80 of a bearing assembly 82. The inner race 84 of the bearing assembly 82 is fixed to a guide block 86.

Also fixed within the guide block 86 is a longitudinal bearing assembly 88. The bearing assembly 88 provides low frictional retention of the guide block 86 upon guide rod 90. The guide rod 90 is rotationally supported by means of bearing assemblies 92 and 94 with respect to the apparatus housing 22. The guide rod 90 is prevented from longitudinal movement with respect to the apparatus housing 22 by means of snap ring 96 located at one end of the rod 90 with a nut 98 located at the opposite end.

Upon rotation of the shaft 60, the nut 78 is caused to move longitudinally either upward or downward upon the threaded portion 76 of the shaft 60. Rotation of the nut 78 itself is prevented due to bein connected through the bearing assembly 82 to the guide block 86. Surrounding the shaft 60 on each side of the nut 78 and being connected to the apparatus housing 22 are flexible bellows 100 and 102. It is the function of the bellows 100 and 102 to prevent foreign matter from coming into contact with the shaft 60 and prevent smooth unhindered movement of the nut 78 upon the shaft 60.

As the nut 78 is moved upon shaft 60, it can be readily seen that the guide block 86 moves in synchronism therewith longitudinally upon the guide rod 90. A connecting arm 104 is secured by a fastener 106 to the guide block 86 and also moves in synchronism therewith. The connecting arm 104 is fixedly secured to the electrode housing 26. Therefore, as the guide block 86 moves upon the guide rod 90, the electrode 34 either moves toward or away from the workpiece which is represented by the cylindrical tubes 28 and 30.

It is to be noted that the welding voltage is directly dependent upon the distance of the electrode 34 from the workpiece. It is desired that this welding voltage be maintained in a preselected level. However, each workpiece is slightly different in shape and inherently includes recesses and raised areas. Therefore, the gap between the electrode and the workpiece, after being initially established, cannot be maintained constant as the electrode moves about the workpiece. It is to be understood that normally the welding apparatus will be moved about the workpiece. However, it is envisioned that the workpiece could be moved relative to the apparatus. An appropriate type of movement apparatus to effect movement of the welding apparatus 20 of this invention about the workpiece is readily shown and described within U. S. Pat. application Ser. No. 136,112, filed Apr. 21, 1971, entitled "Welding Head Supporting Apparatus."

Figure 17:
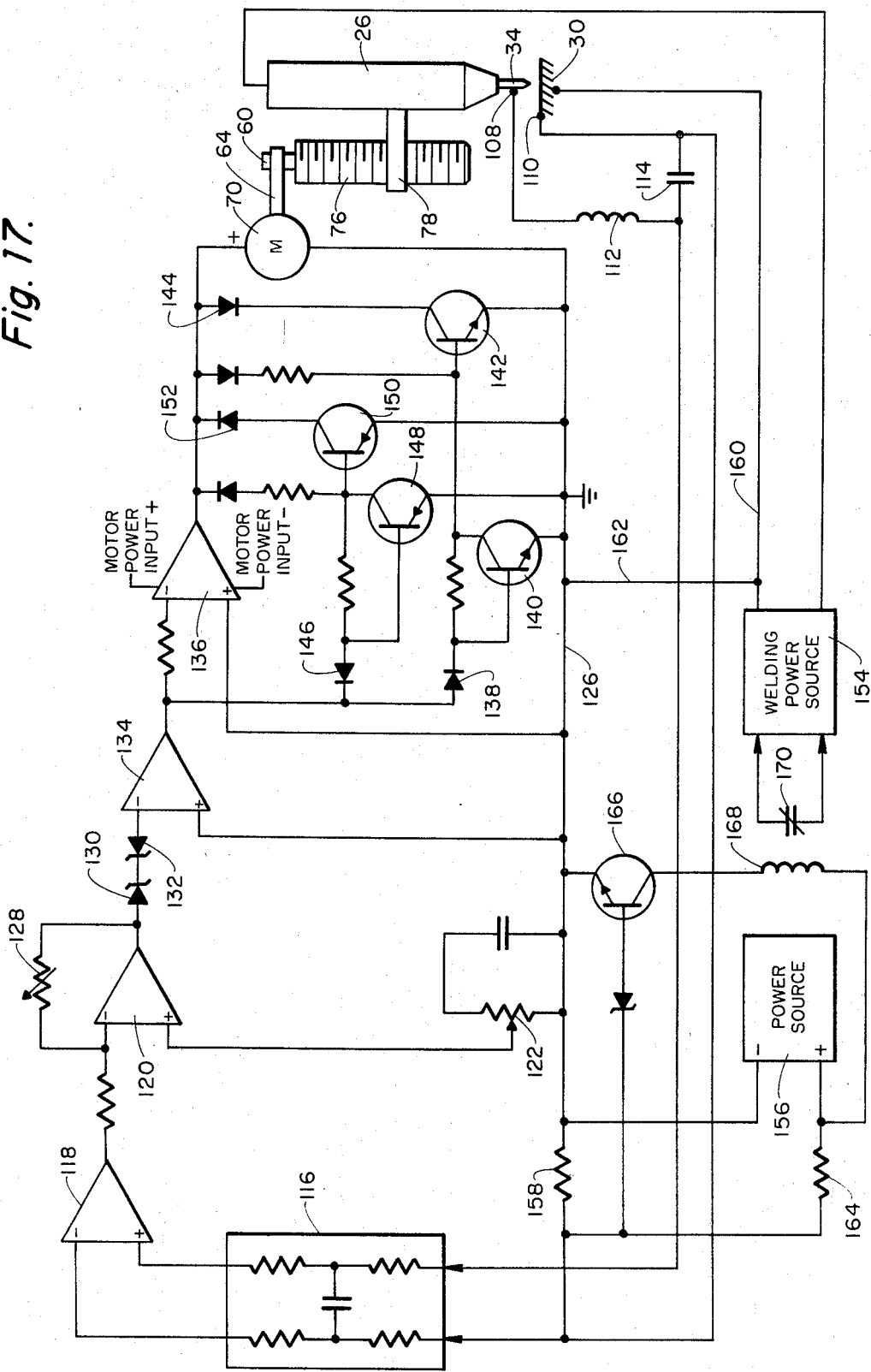
FIG. 17 is an electrical circuit diagram of the automatic voltage control system employed within this invention.

Because the gap between the electrode 34 and the workpiece 30 cannot be preestablished and maintained, some type of control apparatus must be employed which will automatically adjust the gap between the electrode 34 and the workpiece as the apparatus moves about the workpiece. Such a control system is shown within FIG. 17 of the drawings.

It is highly desirable to keep the welding voltage as constant as possible in order for a high quality type of weld to be produced. Since the welding apparatus is designed to move at the rate of several feet per minute about the workpiece, the electrode 34 will quickly come upon any hiatus formed within the workpiece surface. This means that the electrode 34 must be moved quite quickly to compensate for the hiatus to maintain the constant quickly. This quick movement is to be accomplished by means of the motor 70 which is what is commonly referred to as a torque motor. Torque motors are capable of making extremely fast responses which is needed in this instance and such motors are also capable of being operated either clockwise or counterclockwise which is required in this situation.

The preselected voltage value is to be measured between the electrode 34 and the workpiece by means of electrical contacts 108 and 110. At the time the arc is struck, a high energy field is initially generated across the arc gap. This high energy initial field could be quite damaging to the control system and therefore inclusion of the inductor 112 and the capacitor 114 is to suppress this high energy initial field.

The welding voltage is transmitted to an attenuator 116 and into an amplifier 118. The amplified voltage is then transmitted into a second amplifier 120. The amplifier 120 compares the sensed voltage with a reference voltage which is transmitted from a potentiometer 122. The potentiometer circuit includes a potentiometer 122, a capacitor 124, with each end of the potentiometer circuit being connected to the electronics ground line 126.

A variable resistor 128 is interposed about the second amplifier 120 and is to function as a deadband adjustment. Upon the sensed voltage being compared with the reference voltage, either a positive or a negative error voltage will result except for the unusual situation when the voltages are exactly equal. It is desirable for this error voltage to exceed a certain level before such is transmitted to effect activation of the motor 70. Therefore, the deadband, represented by variable resistor 128, is to be adjusted so as to make the error voltage ineffective within a certain band or range. In other words, if the error voltage, multiplied by the gain of amplifier 120 is less than the breakover voltage of the diodes 130 or 132, no signal is transmitted to amplifier 134. If the voltage is sufficiently great enough to exceed the breakover voltage of the diodes 130 or 132, either a positive or a negative signal from the amplifier 134 will be transmitted to amplifier 136. If a positive signal is transmitted to the motor 70, the motor will be driven clockwise. If a negative signal is transmitted from the amplifier 136, the motor 70 will be driven counterclockwise. The driving of the motor 70 will either raise or lower the electrode 34 so as to bring the arc voltage to the level established by the reference voltage created by the potentiometer 122. As soon as the arc voltage is within the deadband which is produced by the variable resistor 128, the signal to drive the motor is cut off (by the zero signal of amplifier 134) and at the same time the braking circuit is activated which effectively short circuits the motor 70.

It is desirable to employ a braking circuit in order to eliminate continued inertial movement of the motor 70 resulting in continued inertial movement of the electrode 34. At the time the motor 70 is cut off, it begins to act as a generator. It is known that stopping a generator is readily accomplished by the placement of a large load within the generator circuit. The greatest load which can be achieved is a short circuit which will bring the motor 78 to a stop within a few milliseconds and still within the deadband range. The braking circuit included within the structure of this invention is designed to provide a short circuit only when no signal is produced by amplifier 134.

Let it be assumed that a positive signal is being transmitted from the amplifier 134 with such signal also being transmitted through diode 138 which in turn activates transistors 140 and 142. Upon this positive signal going to zero, transistors 140 and 142 are turned off which permits the generated potential of the motor 70 to be transmitted through diode 144 to ground line 126. In essence, a short circuit has occurred.

Upon a negative signal being transmitted from the amplifier 134, said signal is transmitted through diode 146 and activates transistors 148 and 150. Upon the signal from the amplifier 134 becoming zero, the transistors 148 and 150 are deactivated. As a result, the generated voltage from the motor 70 is transmitted through the transistor 150 and the diode 152 to in essence short circuit the motor 70.

If for some reason the workpiece was removed or displaced from the electrode 34 a substantial distance, it would still be possible, if someone activated the welding power source 154, to cause the arc to strike at the electrode 34. This striking of the arc may be dangerous and could cause injury or damage. Therefore, if the workpiece has been removed, it is desirable to prevent such an arc being struck.

To prevent the arc from striking, a safety circuit is provided which includes the use of a power source 156 which supplies the small current across resistor 158 located within the electronics ground line 126. The welding ground line 160 is connected through line 162 to the electronics ground line 126. The slight potential from the power source 156 is designed to be normally absorbed by resistor 158 and the resistor 154.

However, if the ground connection 160 is now lost, a potential exists between ground connections 126 and 160. This potential effects activation of transistor 166 which results in the activation of a relay 168. The relay 168 then causes the normally closed contact 170 to open. With the contact 170 in the open position, it is not possible to activate the welding power source 154 and the striking of the arc about the electrode 34.

Referring particularly to FIGS. 4, 5 and 8 to 14 of the drawings, the electrode oscillating mechanism incorporated within this invention is depicted. Motor 172 is fixedly mounted within the apparatus housing 22 which is to be operated by a power source, not shown. The motor 172 effects rotation of a drive shaft 174 which in turn is fixedly secured to a first clutch plate 176.

Figure 4:
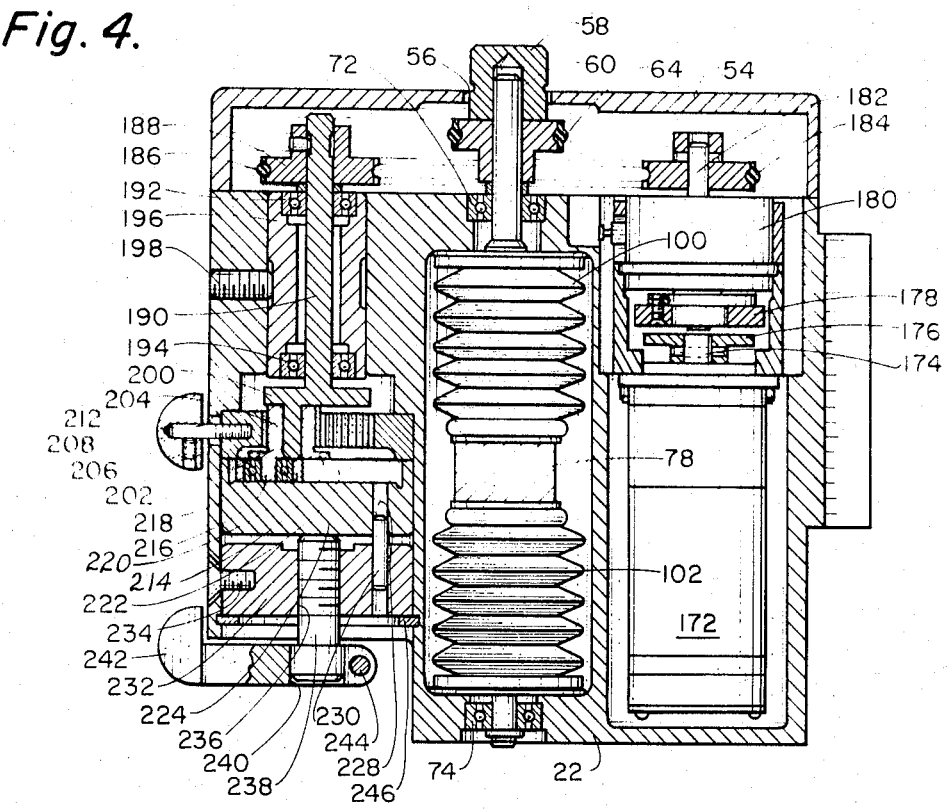
FIG. 4 is a cross-sectional view of the apparatus of this invention taken along line 4—4 of FIG. 2.
Figure 5:
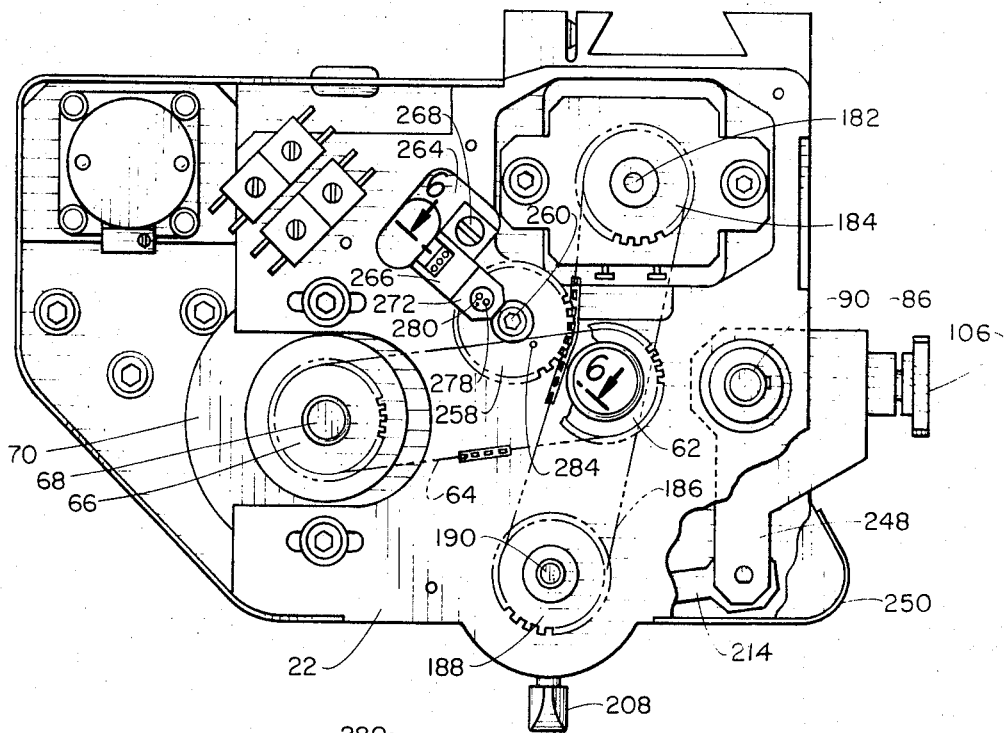
FIG. 5 is a view of a portion of the apparatus of this invention taken along 5—5 of FIG. 2.

Located directly adjacent the first clutch plate 174 and shown spaced therefrom in FIG. 4 of the drawings is a second clutch plate 178. The second clutch plate 178 is connected through clutch mechanism 180 to a drive shaft 182. The clutch mechanism 180 is deemed to be conventional and includes a magnetic biasing means which is to be activated electically. The clutch mechanism 180, as depicted in FIG. 4, shows such to be inactivated with the clutch plates 176 and 178 spaced from each other and not in engagement. Upon activation of the clutch mechanism 180, the biasing means located within the mechanism 180 causes plate 178 to move into frictional engagement with the plate 176.

A drive wheel 184 is fixedly secured upon the drive shaft 182. A bolt 186 is engaged about the periphery of the drive wheel 184 with the opposite end of the belt 186 in engagement with a drive wheel 188. The drive wheel 188 is fixedly mounted upon an operating shaft 190. Shaft 190 is rotatably mounted by bearing assemblies 192 and 194 within a sleeve 196. The sleeve 196 is fixedly mounted by means of set screws 198 within the apparatus housing 22.

The free end of the operating shaft 190 is integrally connected to a plate 200. Eccentrically mounted with respect to the operating shaft 190 and located on the opposite side of the plate 200 is a pin 202. Pin 202 is to rotationally cooperate with an external gear 204. The pin 202 cooperates with an aperture centrally located within the gear 204.

An internal ring gear 206 is located about the external gear 204 and fits within appropriate recess means within the apparatus housing 22. The eccentric location of pin 202 is such so that the external gear 204 is in continuous contact with the internal gear 206. The internal gear 206 is pivotally mounted with respect to the apparatus housing 22 with such pivoting action being caused manually by means of handle 208 which is screw threadingly attached within threaded opening 210 within the internal gear 206. The threaded portion of the handle 208 passes through an opening 212 within the apparatus housing 22 in order to communicate with the opening 210. The sides of the opening 212 function as stops for limiting the amount of pivotal movement of the internal gear 206. It is to be noted that the amount of pivotal movement of the interal gear 206 is to be limited to 90°, the reason for such which will become apparent further on in the description.

A plate 214 is connected to the external gear 204 and on its underside thereof includes a pin 216. Pin 216 is rotatably mounted by means of bearing 218 to an actuating arm 220. The actuating arm 220 is located within a chamber 222 formed within a brake block 224. A slot 226 is formed within a side of the brake block 224 in order to permit the actuating arm 220 to extend exteriorly therefrom. The brake block 224 is confined within a cylindrical recess formed within the apparatus housing 22.

The brake block 224 includes an opening 228 within which a guide pin 230 is located. The guide pin 230 is capable of a limited amount of movement within the opening 228 with the pin 230 being fixed within fixed block 232. The fixed block 232 is fixedly located to the apparatus housing 22 by means of screw fastener 234. A threaded opening 236 is centrally located within the fixed block 232. A threaded bolt 238 threadingly cooperates with the opening 236. The head of the bolt 238 is fixedly mounted within an opening 240 within a handle 242. The bolt 238 is fixed within the handle 242 by means of fastener 244. The free end of the bolt 230 is to be in continuous contact with the underside of the guide block 232. A snap ring 246 cooperates at the underside of the fixed block 232 within recess means formed within the fixed housing 22.

The free end of the actuating arm 220 is pivotally connected to extension 248 of the guide block 86. A cover 250 is secured to the fixed housing 22 and is to protect the actuating arm 220 and its connections from being contaminated from foreign material.

The operation of the oscillating apparatus employed within this invention is as follows: Assuming that the clutch plates 176 and 178 are in frictional contact with each other, upon operation of motor 172 rotation of drive wheel 184 occurs which results in rotation of drive wheel 188 through belt 186. As a result, operating shaft 190 is rotated which results in a circular path movement of pin 202. This circular path of movement also results in rotation of external gear 204 about the internal gear 206. This in turn causes the pin 216 to move in a certain path.

Referring particularly to FIGS. 9 to 14 of the drawings, the pin 216 is represented in dotted lines as the center of one end of the actuating arm 220. The path of movement of this pin 216 is represented by the arrow 252 within the series of FIGS. 9 to 11. The same pin 216 and its path of movement is also represented by arrow 254 within FIGS. 12 to 14. It is readily apparent that the path of movement of FIGS. 12 to 14 is different than that of FIGS. 9 to 11 by reason of the pivotal movement of the internal gear 206 to a different position.

As the operating shaft 190 is rotated, the external gear 204 moves in a circle about the center axis of the operating shaft 190. However, the external gear 204 itself rotates which causes the pin 216 and its connected end of the actuating arm 220 to move in a certain path. This path, due to the proper selection of the eccentricity of the pin 202, the size of the external gear 204, the size of the internal gear 206 and the location of the pin 216, results in a linear path of the pin 216 at all times. This linear path can assume various angular positions but will remain linear.

Within FIGS. 9 to 11 it is to be noted that the linear path, represented by arrow 252, is substantially transverse to the elongated actuating arm 220. Therefore, as the operating shaft 190 is rotated, the operating end of the actuating arm 220 is moved back and forth in a transverse manner with only a pivoting action of the connecting end of the actuating arm occurring with respect to the extension 248. As a result, the guide block 86 does not pivot with respect to the fixed housing but stays stationary. Since such is stationary, the electrode 34 does not oscillate transversely. This setting, which is to be preselected by the location of the internal gear 206 by means of manually moving handle 208, is to be employed when a very small weld is to be produced, usually between rather smaller diametered workpieces.

Within FIGS. 12 to 14 the handle 208 is shown pivoted approximately 30° from the position of FIGS. 9 to 11. It is to be understood that the handle 208 can further be pivoted to a position approximately 90° from that shown within FIGS. 9 to 11. At this 90° position the maximum amplitude of the oscillating movement would occur.

Because of the pivoting of the internal gear 206 with respect to the external gear 204 within FIGS. 12 to 14, the path of the pin 216 represented by the arrow 254 is canted approximately 30° with respect to the arrow 252. As a result, not only does the actuating arm 220 move transversely, but also a movement component in the elongated direction of the actuating arm 220 occurs. This results in an oscillatory or back and forth motion of the extension 248. This oscillatory movement of the extension 248 is transferred into pivotal motion of the guide block 86 by being pivoted about guide rod 90. As a result, an oscillating arcuate path, represented by arrow 256 occurs with the electrode 234. This oscillatory movement will have been preselected in view of the width of the weld bead 32 which is to be produced. Normally this selection will be such so that the electrode 34 will be moved adjacent the edges of the weld bead 32 during its oscillatory movement.

As previously mentioned, it is to be understood, that compared to FIGS. 12 to 14, a greater amplitude of the oscillatory movement can be achieved by further pivotal action of the internal gear 206 by manually moving such by means of handle 208. However, upon the ninety degree position being achieved as previously mentioned, the maximum amplitude of the oscillatory movement will then be achieved with no transverse component but only a longitudinal movement component resulting. Normally this maximum amplitude will not exceed 1½ to 2 inches.

Upon the pivotal movement of the internal gear 206 being established, it is desired to maintain the position of the internal gear and not permit such to vary. Therefore, the use of the brake block 224 is employed.

Upon the desired position of the internal gear 206 being established, the operator then manually pivots the handle 242 in a tightening direction. As a result, the bolt 228 is moved relative to the fixed block 232 and likewise effects a movement of the brake block 224. The peripheral edge of the upper surface of the brake block 224 located adjacent chamber 222 is caused to come into frictional engagement with the internal gear 206. This frictional engagement forces the internal gear at its upper surface thereof into frictional engagement with the fixed housing 22. The depth of the chamber 222 is selected so as to not hinder the movement of the actuating arm 214 within the chamber 222. As a result, the preselected position of the internal gear 206 is frictionally held and accidental removal thereof is prevented.

When it is desired to change the amplitude of the oscillatory movement, it is only necessary to effect a quick untightening movement of the handle 242 which releases the brake block 224 which likewise releases the internal gear 206. Therefore, ease is caused of pivotal movement of the internal gear 206 by means of handle 208.

In the producing of significant width weld beads 32, normal continuous back and forth oscillatry movement tends to produce a weld bead with a high center. Therefore, it is desirable to fill in the edges of the weld bead. In order to fill in the edges, it is required that the welding electrode pause or dwell adjacent the edge of the weld bead to result in the depositing of an additional amount of the filler wire 38. The apparatus to effect the dwelling of the electrode 34 will be described as follows:

It is necessary that the apparatus to effect the dwelling be moved in synchronism with the apparatus to effect the oscillatory movement. In order to do this, a drive wheel 258 is employed which has the same number of teeth and is the same size as the drive wheel 188 which is responsible for the producing of the oscillatory motion. The drive wheel 258 is also driven by belt 186 and is rotatably mounted upon the fixed housing 22. The drive wheel 258 is to be in continuous engagement with the belt 186 as the drive wheel 188 is also in continuous engagement therewith. The drive wheel 258 is rotatably supported with respect to the apparatus housing 22 by means of bolt 260. A bearing assembly 262 is located between the bolt 260 and the drive wheel 258.

Formed within the apparatus housing 22 is a recess 264. A bracket 266 is fixedly mounted to the apparatus housing 22 within the recess 264 by means of screw fastener 268. The configuration of the bracket 266 is basically bifurcated having a cut-out section 270 located between legs 272 and 274. Fixedly mounted within leg 270 is a light source 276. Light source 276 is to be supplied electrical energy from a power supply, not shown. Located within the leg 272 is a first photocell 278 and a second photocell 280. It is to be understood for the purpose of description that the photocells 278 and 280 and the light source 276 have been enlarged for illustrative purposes.

Figure 6:
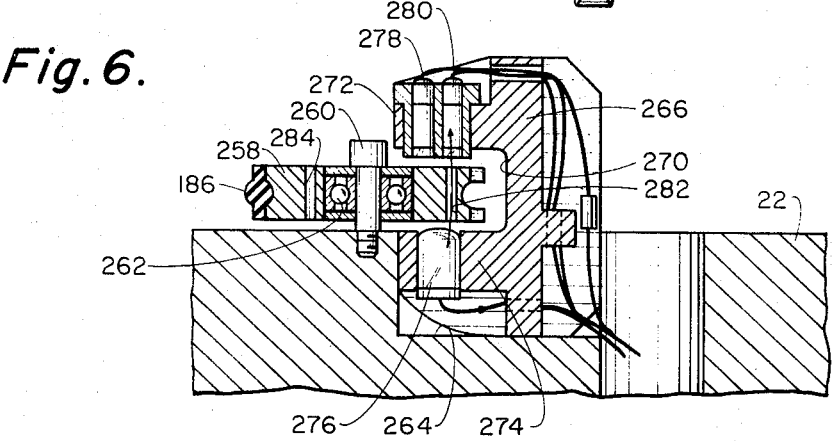
FIG. 6 is a cross-sectional view through a portion of the apparatus of this invention taken along line 6—6 of FIG. 5.
Figure 7:
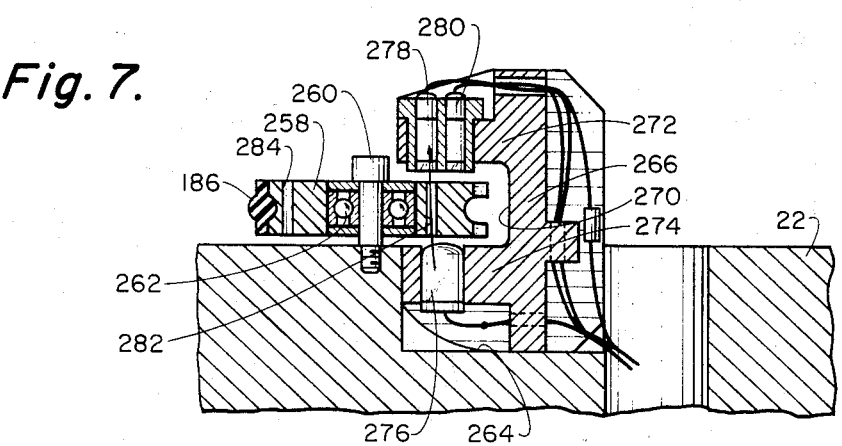
FIG. 7 is a view similar to FIG. 6 but showing the light source communicating with the opposite photocell which is shown in FIG. 6.

Located within the drive wheel 258 are a pair of apertures 282 and 284. The apertures 282 and 284 are diametrically located opposite each other with respect to the center of the drive wheel 258. However, aperture 282 is located at a further radially outward distance from the center of the drive wheel 258 than aperture 284. The arrangement of the apertures 282 and 284 is such so that during a single complete 360° revolution of the drive wheel 258, aperture 282 at one point will permit of light from the light source 276 to activate photocell 280. Also, during a single 360° revolution of the drive wheel 258, at one point the aperture 284 will be located so that light from the light source 276 will pass therethrough into photocell 278. The previous arrangement is shown in FIG. 6 of the drawings with the latter arrangement shown in FIG. 7 of the drawings.

Figure 15:
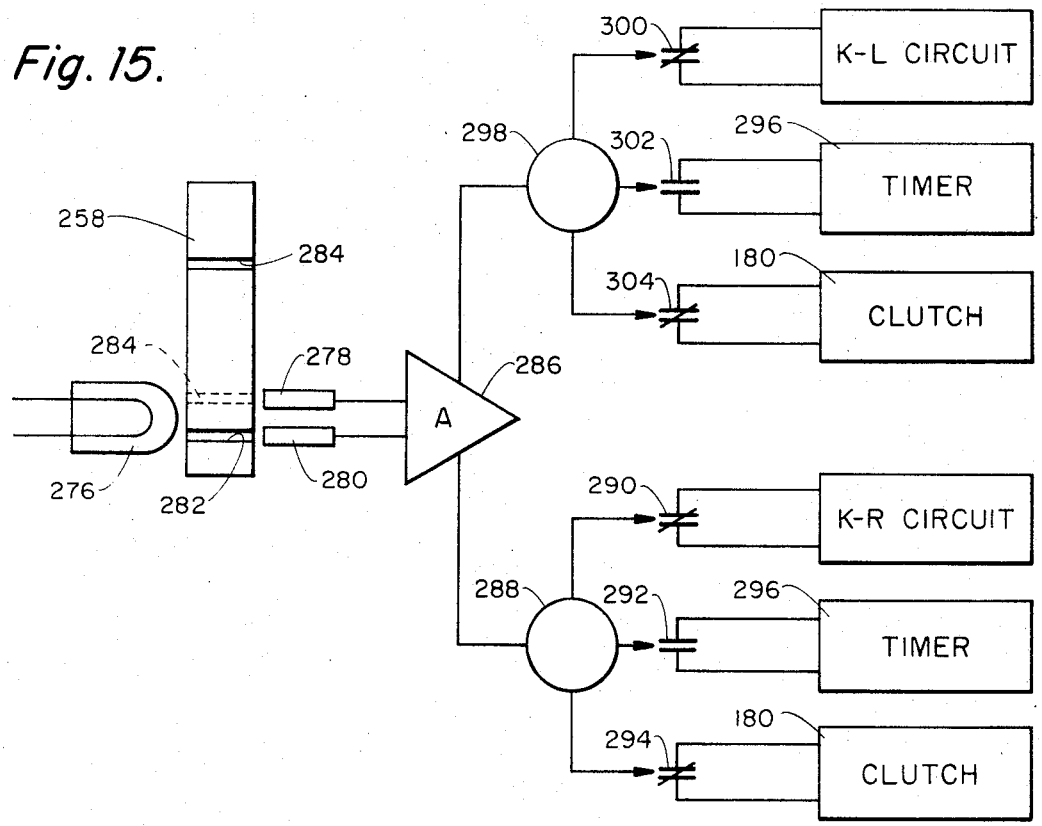
FIG. 15 is a block diagram of the electrical circuitry employed to effect production of the dwell within the oscillating motion.

The position of the drive wheel 258 is such with respect to the drive wheel 188 so that upon the light from the light source 276 passing through the aperture 282 and into the photocell 280, the electrode 34 is located at one point of maximum displacement in its oscillatory movement path. At that position it is desired to effect a dwell, which is caused by activation of the clutch mechanism 180 and disengagement of the clutch plates 176 and 178. Referring particularly to FIG. 15 of the drawings, this engagement procedure can be described in more detail.

Upon the photocell 280 being activated, a signal is transmitted to amplifier 286. The amplified signal is then transmitted to activate a relay 288. The relay 288 upon being activated, opens normally closed contact 290, closes normally open contact 292 and opens normally closed contact 294. Contact 294 upon being opened causes activation of the magnetic clutch mechanism 180. As a result, frictional clutch engaging plates 176 and 178 are caused to be spaced from each other resulting in disengagement of the clutch and a stopping of the movement of the welding electrode 34.

At the same time the clutch mechanism 180 is activated, a timer 296 is activated by the closing of the contact 292. The construction of the timer is not specifically shown but is deemed to be conventional with such electronic timer mechanisms being commercially available from several sources. Basically, the timer structure can be preselected to produce a dwell for a period of time between 1/10 to 2 seconds. At the end of the timed dwell period, the timer mechanism 296 is to transmit a signal directly to the clutch mechanism 180 and effect an overriding of the previous signal and effect engagement of the clutch plates 176 and 178. Also along with the activation of contacts 292 and 294, a contact 290 is activated which is located within the circuitry which would be activated by photocell 278. The opening of contact 290 thereby prohibits inadvertent activation of the opposite circuit which might cause an increase in dwell time.

Upon the timer mechanism 296 having been reactivated, the clutch mechanism 180 and the drive wheels 184 are again driven as well as the wheel 258. Upon the wheel 258 being slightly rotated, the light source is no longer capable of passing through aperture 282 and into contact with photocell 280. Therefore, photocell 280 becomes inactive resulting in no signal being transmitted to amplifier 286 which results in deactivation of relay 288. This deactivation of relay 288 results in contact 290 returning to the closed position, contact 292 returning to the open position and contact 294 returning to the closed position which places all components back in the original position.

Upon 180° movement of the drive wheel 258, the aperture 284 becomes located between the light source 276 and the photocell 278. Upon activation of photocell 278, a similar occurrence occurs with respect to the previous arrangement with the signal being transmitted from amplifier 286 to relay 298. With the relay 298 being activated, normally closed contact 300 is open with normally open contact 302 closed and normally closed contact 304 opened. In a similar manner the clutch mechanism 180 is then deactivated which results in disengagement of the plates 176 and 178 resulting in a dwell being produced. At the same time by the closing of contact 302 the timer mechanism 296 is activated for a particularly selected dwell time.

It is to be understood that the timer mechanism 296 is to normally include two timing circuits so that separate dwell times can be established for the opposite sides of the maximum displacement point of the oscillating movement path. At the same time contact 300 is open which is located within the circuit path which is activated by photocell 280 to insure that circuit path cannot be inadvertently activated.

Figure 16:
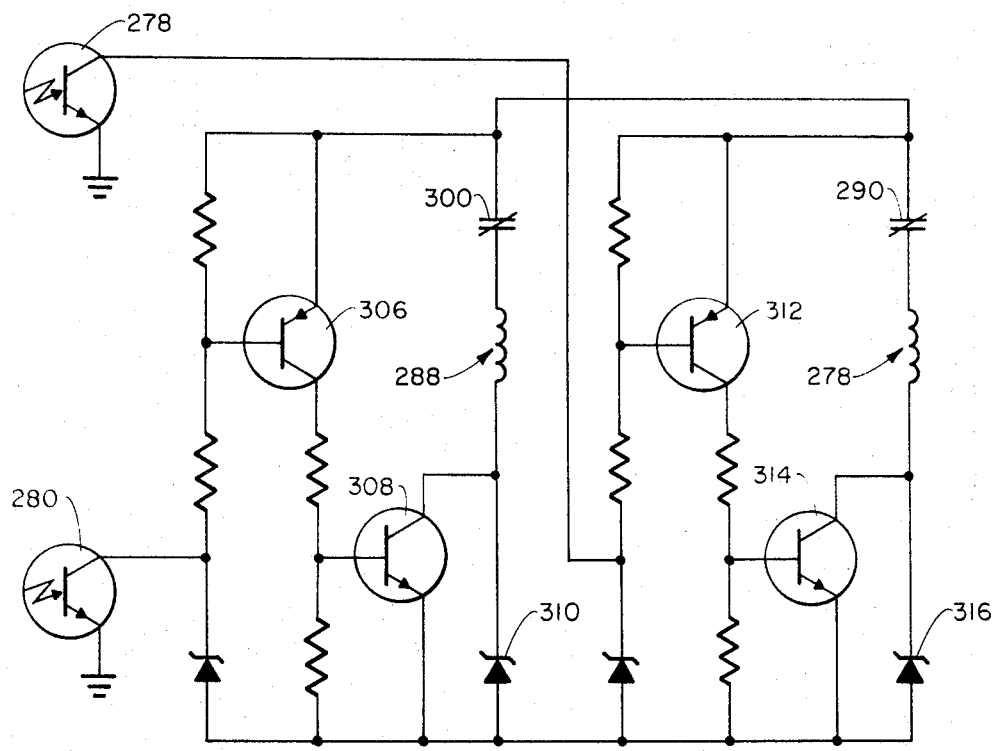
FIG. 16 is an electrical circuit diagram of the block diagram shown in FIG. 15.

Referring particularly to FIG. 16 of the drawings, a more detailed electrical diagram is shown of the block diagram arrangement shown in FIG. 15 of the drawings. Upon the photocell 280 being activated, a signal is caused to activate transistor 306. By activation of transistor 306, a signal is transmitted to transistor 308 which results in a current flow through diode 310 to activate relay 288. The relay 288 is also interconnected to contact 290 which is simultaneously opened. Upon the photocell 280 being deactivated, transistors 306 and 308 are deactivated which results in deactivation of relay 288 which results in a reclosing of contact 290.

Upon photocell 278 being activated, a signal is transmitted to transistors 312 and 314 in a similar manner. The signal from the transistor 314 is transmitted through diode 316 to activate relay 298. Upon activation of relay 298, clutch mechanism 180 is activated to disengage the clutch plates 176 and 178 as in a similar manner the timer mechanism 296 is activated with contact 300 being opened. Upon deactivation of the photocell 278, the transistors 312, 314 and the relay 298 are deactivated with the result that contact 300 as well as contacts 302 and 304 are returned to their original positions.

We claim:

1. An apparatus for producing oscillatory movement transverse to the longitudinal path of movement of a welding electrode comprising:
   support means for retaining said electrode;
   actuating means connected to said support means, said actuating means including means for causing movement of said support means to result in transverse oscillatory movement of said electrode;
   movement producing means connected through a driving means to said actuating means;
   dwell producing means for causing a dwell in said oscillatory movement at a point of maximum displacement of said electrode;
   a motor assembly connected to said movement producing means, said motor assembly to operate said actuating means through said driving means; and
   said dwell producing means includes a photocell sensing arrangement which is connected to said motor assembly, said photocell sensing arrangement is connected to control means to effect non-transmitting of the torque of said motor assembly to said actuating means.

2. An apparatus as defined in claim 1 wherein:
   said control means includes a clutch, said clutch connected between said motor assembly and said actuating means, said photocell sensing arrangement capable of disengaging said clutch thereby producing said dwell.

3. Apparatus as defined in claim 2 wherein:
   said control means of said dwell producing means including a timer assembly to control the length of dwell time, said timer assembly connected to said clutch, upon disengaging of said clutch said timer assembly being engaged, said timer assembly operates reengagement means to effect reengagement of said clutch after expiration of the dwell time established by said timer assembly.

4. Apparatus as defined in claim 3 wherein:
   said photocell sensing arrangement includes a first photocell and a second photocell, a light source, blocking means located between said light source and said first and second photocells to normally prevent light from being transmitted from said light source to said photocells, aperture means located within said blocking means, said aperture means to permit transmission of light from said light source to either of said photocells which activates said control means, said first photocell to control dwell of said electrode at one side of the electrode path with said second photocell to control dwell at the opposite side of the electrode path.

5. Apparatus as defined in claim 4 wherein:
   said timer assembly comprises a first timer operated through means by said first photocell and a second timer operated through means by said second photocell.

6. Apparatus as defined in claim 4 wherein:
   said blocking means comprises a rotating disc, said disc connected through means to said electrode, a complete rotation of said disc to be synchronous to a complete cycle of said oscillatory movement, said aperture means includes a pair of apertures diametrically located upon said disc, the radial spacing of said apertures upon said disc being different, only one of said apertures permitting light transmission between said light source and said first photocell during a complete revolution of said disc with only the other of said apertures permitting light transmission between said light source and said second photocell during a complete revolution of said disc.

7. An apparatus for producing oscillatory movement transverse to the longitudinal path of movement of a welding electrode comprising:
   support means for retaining said electrode;
   actuating means connected to said support means, said actuating means including means for causing movement of said support means to result in transverse oscillatory movement of said electrode;
   movement producing means connected through a driving means to said actuating means;
   dwell producing means for causing a dwell in said oscillatory movement at a point of maximum displacement of said electrode;
   said movement producing means includes an external gear, an internal gear located about said external gear and in continuous engagement therewith, a motor assembly connected to said external gear, said external gear attached to said driving means, whereby rotational movement of said external gear is capable of causing lineal movement in a given direction of said driving means.

8. Apparatus as defined in claim 7 wherein:
   said internal gear mounted within a housing, said internal gear being pivotal within said housing, a pin eccentrically mounted upon said external gear, said pin connected to said driving means, said pin movable substantially through a lineal path as said external gear rotates, pivoting of said internal gear also changes the position of said external gear thereby changing the angular position of said lineal path to said given direction of said driving means to thereby change the amplitude of said oscillatory movement.

9. Apparatus as defined in claim 8 including:
   lock means connected to said housing to fixedly position said internal gear at the established pivotable position.

10. Apparatus as defined in claim 8 including:
    a motor assembly connected to said movement producing means, said motor assembly to operate said actuating means through said driving means; and
    said dwell producing means including a photocell sensing arrangement which is connected to said motor assembly, said photocell sensing arrangement is connected to control means to effect non-transmitting of the torque of said motor assembly to said actuating means.

11. Apparatus as defined in claim 10 wherein:
    said control means includes a clutch, said clutch connected between said motor assembly and said actuating means, said photocell sensing arrangement capable of disengaging said clutch thereby producing said dwell.

12. An apparatus for producing transverse oscillatory movement of a welding electrode comprising:
    support means for retaining said electrode;
    actuating means connected to said support means, said actuating means capable of causing movement of said support means to result in transverse oscillatory movement of said electrode; and
    movement producing means connected to said actuating means, said movement producing means including an external gear connected to said actuating means, said external gear in continuous engagement with an internal gear.

13. Apparatus as defined in claim 12 wherein:
said internal gear mounted within a housing, said internal gear pivotable within said housing to thereby change the amplitude of said oscillatory movement.

14. Apparatus as defined in claim 13 wherein:
lock means connected to said housing to fixedly position said internal gear upon the pivotable position of such being established.

15. In an automatic welding apparatus having a welding electrode, said welding electrode to move longitudinally in a prescribed path to produce a weld bead upon a workpiece, said apparatus including:
first means for causing transverse oscillatory movement of said electrodes;
second means for causing a dwelling in said oscillatory movement at a point of maximum displacement
a motor assembly connected to said first means for supplying input power to said first means; and
said second means includes a photocell sensing arrangement which is connected to said motor assembly, said photocell sensing arrangement is connected to control means to effect non-transmitting of the torque of said motor assembly to said first means.

16. Apparatus as defined in claim 15 wherein:
said control means includes a clutch, said clutch connected between said motor assembly and said first means, said photocell sensing arrangement capable of disengaging said clutch thereby producing said dwelling of said oscillatory movement.

17. Apparatus as defined in claim 16 wherein:
said control means of said second means including a timer assembly to control the length of dwell time, said timer assembly connected to said clutch, upon disengaging of said clutch said timer assembly being engaged, said timer assembly operates reengagement means to effect reengagement of said clutch after expiration of the dwell time by said timer assembly.

18. Apparatus as defined in claim 17 wherein:
said photocell sensing arrangement includes a first photocell and a second photocell, a light source, blocking means located between said light source and said first and second photocells to normally prevent light from being transmitted from said light source to said photocells, aperture means located within said blocking means, said aperture means to permit transmission of light from said light source to either of said photocells which activates said control means, said first photocell to control dwell of said electrode at one side of the electrode path with said second photocell to control the dwell at the opposite side of the electrode path.

19. Apparatus as defined in claim 18 wherein:
said blocking means comprises a rotating disc, said disc connected through means to said electrode, a complete rotation of said disc to be synchronous to a complete cycle of said oscillatory movement, said aperture means includes a pair of apertures diametrically located upon said disc, the radial spacing of said apertures upon said disc being different, only one of said apertures permitting light transmission between said light source and said first photocell during a complete revolution of said disc with only the other of said apertures permiting light transmission between said light source and and said second photocell during a complete revolution of said disc.

* * * * *